(12) United States Patent
Briffaud et al.

(10) Patent No.: US 10,377,898 B2
(45) Date of Patent: *Aug. 13, 2019

(54) THERMOPLASTIC COMPOSITE MATERIAL MADE OF A SEMI-CRYSTALLINE POLYAMIDE AND METHOD FOR MANUFACTURING SAME

(71) Applicant: ARKEMA FRANCE, Colombes (FR)

(72) Inventors: Thierry Briffaud, Bernay (FR); Gilles Hochstetter, L'Hay les Roses (FR)

(73) Assignee: ARKEMA FRANCE, Colombes (FR)

( * ) Notice: Subject to any disclaimer, the term of this patent is extended or adjusted under 35 U.S.C. 154(b) by 27 days.

This patent is subject to a terminal disclaimer.

(21) Appl. No.: 15/667,211

(22) Filed: Aug. 2, 2017

(65) Prior Publication Data

US 2017/0335107 A1 Nov. 23, 2017

Related U.S. Application Data

(62) Division of application No. 14/438,062, filed as application No. PCT/FR2013/052508 on Oct. 21, 2013, now Pat. No. 9,752,029.

(30) Foreign Application Priority Data

Oct. 23, 2012 (FR) ...................... 12 60058

(51) Int. Cl.
| | | |
|---|---|---|
| *C08L 77/06* | (2006.01) | |
| *C08L 77/04* | (2006.01) | |
| *C08K 7/04* | (2006.01) | |
| *C08J 5/04* | (2006.01) | |
| *C08J 5/24* | (2006.01) | |
| *C08G 69/26* | (2006.01) | |
| *B29C 70/02* | (2006.01) | |
| *C08K 3/40* | (2006.01) | |

(52) U.S. Cl.
CPC ............ *C08L 77/06* (2013.01); *B29C 70/021* (2013.01); *C08G 69/265* (2013.01); *C08J 5/04* (2013.01); *C08J 5/24* (2013.01); *C08K 7/04* (2013.01); *C08J 2377/06* (2013.01); *C08L 2205/025* (2013.01)

(58) Field of Classification Search
USPC .................................. 524/494, 602; 528/288
See application file for complete search history.

(56) References Cited

U.S. PATENT DOCUMENTS

| | | | |
|---|---|---|---|
| 3,696,074 A | 10/1972 | Tsuda et al. | |
| 4,927,583 A | 5/1990 | Lottiau et al. | |
| 5,047,263 A | 9/1991 | Glemet | |
| 5,138,021 A | 8/1992 | Judas et al. | |
| 5,254,620 A | 10/1993 | Goetz et al. | |
| 5,391,572 A | 2/1995 | Goetz et al. | |
| 5,422,418 A | 6/1995 | Maj et al. | |
| 5,665,855 A | 9/1997 | Acevedo et al. | |
| 5,807,966 A | 9/1998 | Pfaendner et al. | |
| 6,130,312 A | 10/2000 | Murakami | |
| 7,592,558 B2 | 9/2009 | Lima | |
| 7,892,455 B2 | 2/2011 | Bradley | |
| 9,139,707 B2 | 9/2015 | Hochstetter | |
| 9,752,029 B2* | 9/2017 | Briffaud ............... | C08G 69/265 |
| 10,000,662 B2 | 6/2018 | Hochstetter | |
| 2007/0148389 A1 | 6/2007 | Nishioka et al. | |
| 2008/0020219 A1 | 1/2008 | Bouquerel et al. | |
| 2008/0274355 A1 | 11/2008 | Hewel | |
| 2009/0062452 A1 | 3/2009 | Harder et al. | |
| 2009/0105392 A1 | 4/2009 | Yamauchi | |
| 2010/0215920 A1 | 8/2010 | Orange et al. | |
| 2011/0052848 A1 | 3/2011 | Doshi et al. | |
| 2011/0123749 A1 | 5/2011 | Hewel et al. | |
| 2011/0241249 A1 | 10/2011 | Orange et al. | |
| 2011/0306718 A1 | 12/2011 | Scherzer et al. | |

(Continued)

FOREIGN PATENT DOCUMENTS

| | | |
|---|---|---|
| CN | 102 234 373 A | 11/2011 |
| EP | 0 201 367 A1 | 11/1986 |

(Continued)

OTHER PUBLICATIONS

International Search Report (PCT/ISA/210) dated Jan. 10, 2014, by the European Patent Office as the International Searching Authority for International Application No. PCT/FR2013/052508.
Kroschwitz, Jacqueline I., Executive Editor, "Cycloaliphatic Amines", Kirk-Othmer Encyclopedia of Chemical Technology, 4$^{th}$ Edition, 1992, pp. 386-405, vol. 2, John Wiley & Sons, Inc., New York, USA (24 pages).
Dolden, J.G., "Structure-property relationships in amorphous polyamides," Polymer, Oct. 1976, pp. 875-892, vol. 17, Elsevier Science Publishers B.V., Great Britain, XP024121175.
Chengxiang, Lu , et al., "Chain Extension of Polyamide 6 Using Bisoxazoline Coupling Agents," Journal of Macromolecular Science, Part B: Physics, Jan. 2008, pp. 986-999, vol. 47, Taylor & Francis Group, LLC., XP055163141.
Chengxiang, Lu, et al., "Chemical Modification of Polyamide-6 by Chain Extension with 2,2'-Bis(2-oxazoline)," Journal of Polymer Science, Part B: Polymer Physics, Jan. 1, 2007, pp. 1976-1982, vol. 45, No. 15, Taylor & Francis Group, LLC, XP055163146.

(Continued)

*Primary Examiner* — Tae H Yoon
(74) *Attorney, Agent, or Firm* — Buchanan Ingersoll & Rooney P.C.

(57) ABSTRACT

A composition for a thermoplastic composite material having a thermoplastic matrix made of a semi-crystalline polyamide having a specific composition that includes at least two amide units, A, 55-95 mol %, and B, 5-45 mol %. A corresponds to x.T, wherein x is a $C_9$-$C_{18}$ linear aliphatic diamine and B corresponds to x'.T, wherein x' can be B1): a specific branched x-dependent aliphatic diamine, B2): MXD or B3): a linear x-dependent aliphatic diamine, said polyamide having a glass transition temperature Tg of at least 90° C. and a melting point no higher than 280° C. Also, a method for manufacturing the composite material, the semi-crystalline polyamide polymer, the use of the composition and of the polymer for parts made of composite material, as well as the material and the resulting composite part.

25 Claims, No Drawings

(56) References Cited

U.S. PATENT DOCUMENTS

| | | |
|---|---|---|
| 2012/0022194 A1 | 1/2012 | Bayer et al. |
| 2012/0095161 A1 | 4/2012 | Pawlik et al. |
| 2012/0202896 A1 | 8/2012 | Blondel et al. |
| 2012/0321829 A1 | 12/2012 | Bayer et al. |
| 2013/0131269 A1 | 5/2013 | Davezac et al. |
| 2013/0225770 A1 | 8/2013 | Jang et al. |
| 2013/0338260 A1 | 12/2013 | Center et al. |
| 2013/0338261 A1 | 12/2013 | Center et al. |
| 2014/0194570 A1 | 7/2014 | Kato et al. |
| 2014/0316063 A1 | 10/2014 | Hochstetter et al. |
| 2015/0126646 A1 | 5/2015 | Hochstetter |
| 2015/0258742 A1 | 9/2015 | Hochstetter et al. |
| 2015/0267050 A1 | 9/2015 | Briffaud et al. |
| 2017/0037185 A1 | 2/2017 | Briffaud et al. |
| 2017/0037186 A1 | 2/2017 | Hochstetter et al. |
| 2017/0037199 A1 | 2/2017 | Hochstetter et al. |
| 2017/0037204 A1 | 2/2017 | Briffaud et al. |
| 2017/0037208 A1 | 2/2017 | Hochstetter et al. |
| 2017/0044317 A1 | 2/2017 | Briffaud et al. |

FOREIGN PATENT DOCUMENTS

| | | |
|---|---|---|
| EP | 0 261 020 A1 | 3/1988 |
| EP | 0 425 341 A1 | 5/1991 |
| EP | 0 471 566 A1 | 2/1992 |
| EP | 0 490 155 A2 | 6/1992 |
| EP | 0 550 314 A1 | 7/1993 |
| EP | 0 581 641 A1 | 2/1994 |
| EP | 0 581 642 A1 | 2/1994 |
| EP | 0 739 924 A1 | 10/1996 |
| EP | 1 266 930 A1 | 12/2002 |
| EP | 1 710 482 A1 | 10/2006 |
| EP | 1 741 553 A1 | 1/2007 |
| EP | 1 988 113 A1 | 11/2008 |
| EP | 2 028 231 A1 | 2/2009 |
| EP | 2 325 260 A1 | 5/2011 |
| EP | 2 386 397 A1 | 11/2011 |
| EP | 2 410 020 A1 | 1/2012 |
| EP | 2 535 365 A1 | 12/2012 |
| EP | 2 586 585 A1 | 5/2013 |
| EP | 2631258 A1 | 8/2013 |
| EP | 2746315 A | 6/2014 |
| FR | 2 603 891 A1 | 3/1988 |
| FR | 2 936 441 A1 | 4/2010 |
| FR | 2 958 296 A1 | 10/2011 |
| FR | 2 997 036 A1 | 4/2014 |
| FR | 2 997 089 A1 | 4/2014 |
| JP | 2006-274061 A | 10/2006 |
| KR | 2008 0032357 A | 4/2008 |
| TW | 201311763 A | 3/2013 |
| WO | WO 95/35343 A1 | 12/1995 |
| WO | WO 03/014198 A1 | 2/2003 |
| WO | WO 2005/061209 A1 | 7/2005 |
| WO | WO 2008/155318 A1 | 12/2008 |
| WO | WO 2011/003973 A2 | 1/2011 |
| WO | WO 2011/015790 A2 | 2/2011 |
| WO | WO 2012/053699 A1 | 4/2012 |
| WO | WO 2013/024593 A | 2/2013 |
| WO | WO 2013/060976 A1 | 5/2013 |
| WO | WO 2013/178955 A1 | 12/2013 |

OTHER PUBLICATIONS

U.S. Appl. No. 15/305,563, Thierry Briffaud, Gilles Hochstetter and Mathieu Capelot, filed Oct. 17, 2016, (Cited herein as U.S. Patent Application Publication No. 2017/0044317 of Feb. 16, 2017).

U.S. Appl. No. 15/304,589, Thierry Briffaud, Gilles Hochstetter and Mathieu Capelot, filed Oct. 17, 2016, (Cited herein as U.S. Patent Application Publication No. 2017/0037185 A1 of Feb. 9, 2017).

U.S. Appl. No. 15/304,620, Gilles Hochstetter, Thierry Briffaud and Mathieu Capelot, filed Oct. 17, 2016, (Cited herein as U.S. Patent Application Publication No. 2017/0037186 A1 of Feb. 9, 2017).

U.S. Appl. No. 15/304,657, Gilles Hochstetter, Thierry Briffaud and Mathieu Capelot, filed Oct. 17, 2016, (Cited herein as U.S. Patent Application Publication No. 2017/0037208 A1 of Feb. 9, 2017).

U.S. Appl. No. 15/304,676, Gilles Hochstetter, Thierry Briffaud and Mathieu Capelot, filed Oct. 17, 2016, (Cited herein as U.S. Patent Application Publication No. 2017/0037199 A1 of Feb. 9, 2017).

\* cited by examiner

THERMOPLASTIC COMPOSITE MATERIAL MADE OF A SEMI-CRYSTALLINE POLYAMIDE AND METHOD FOR MANUFACTURING SAME

CROSS REFERENCE TO RELATED APPLICATIONS

The present application is a divisional of U.S. application Ser. No. 14/438,062, filed on Apr. 23, 2015, now U.S. Pat. No. 9,752,029, which is a national stage filing of International Application No. PCT/FR2013/052508, filed on Oct. 21, 2013, which claims the benefit of French Application No. 1260058, filed on Oct. 23, 2012. The entire contents of each of U.S. application Ser. No. 14/438,062, International Application No. PCT/FR2013/052508, and French Application No. 1260058 are hereby incorporated herein by reference in their entirety.

TECHNICAL FIELD

The invention relates to a composition of or for a thermoplastic composite material with a matrix made of a semi-crystalline polyamide (PA) having a glass transition temperature Tg of at least 90° C. and a melting temperature Tm below or equal to 280° C. and also covers a process for manufacturing said composite material, in particular mechanical or structural parts based on said material, to the use of the composition of the invention for parts made of composite material and also the composite part which results therefrom, and for applications in the following fields: the motor vehicle industry, the railroad industry, the marine industry, road transport, wind power, sports, aeronautics and space, the construction industry, panels and leisure.

BACKGROUND

EP 0 261 020 describes the use of reactive semi-crystalline prepolymers based on PA 6, 11 and 12 for manufacturing a thermoplastic composite by means of a pultrusion process. The aliphatic structural prepolymers as described have low Tgs and insufficient mechanical performance levels under hot conditions.

EP 550 314 describes, among its examples, copolyamide (nonreactive) compositions while seeking melting temperatures above 250° C. and limited Tgs, with most of the examples cited having a Tg which is too low (<80° C.) or a Tm which is too high (>300° C.).

EP 1 988 113 describes a molding composition based on a 10T/6T copolyamide with:
40 to 95 mol % of 10T
5 to 40% of 6T.

Polyamides with a high melting temperature above 270° C. are in particular targeted. The examples mentioned and FIG. 1 teaches that the melting temperature of these compositions is at least approximately 280° C.

WO 2011/003973 describes compositions comprising from 50 to 95 mol % of a unit based on a linear aliphatic diamine comprising from 9 to 12 carbon atoms and on terephthalic acid, and from 5 to 50% of a unit combining terephthalic acid with a mixture of 2,2,4- and 2,4,4-trimethylhexanediamine.

US 2011306718 describes a process for pultrusion of reactive aliphatic polyamides having a low Tg, combined with chain extenders of polymeric structure bearing several (and many more than 2) anhydride or epoxide functions. This document describes no nonpolymeric extender.

The drawbacks of the prior art, with the absence of a good compromise between mechanical performance levels and processing ability (ease of transformation) at lower temperature with a shorter production cycle time are overcome by the solution of the present invention which is directed toward semi-crystalline PA compositions, allowing easier processing at lower temperatures with a saving in terms of the overall energy balance of the processing process, a shorter production cycle time and improved productivity, through an ability of said polyamide polymer to rapidly crystallize, all this while maintaining the mechanical performance levels of said final materials at a high level. More particularly, in the case of reactive compositions, it is sought to have faster reaction kinetics while having a crystallization rate and/or temperature for the polymer formed which is also higher.

SUMMARY

The choice of a semi-crystalline polyamide polymer, as matrix of the composite material of the invention, has the advantage, compared with amorphous polyamides, of significantly improved mechanical performance levels, in particular under hot conditions, such as creep resistance or fatigue resistance. In addition, having a melting point above 200° C. has the advantage, in the motor vehicle industry, of being compatible with treatments by cataphoresis, which a structure of amorphous PA type does not allow. As for the amorphous polyamides, a Tg above or equal to 90° C. is sought in order to provide the composite with good mechanical properties over the entire temperature range for use, for example up to 90° C. for wind power, up to 100° C. for the motor vehicle industry and up to 120° C. for aeronautics. On the other hand, a melting point which is too high, in particular above 280° C., is detrimental since it requires the composite to be processed at higher temperatures with restrictions regarding the molding material to be used (and associated heating system) and an over consumption of energy with, in addition, risks of thermal degradation by heating at temperatures higher than the melting temperature of said polyamide, with, as a consequence, the properties of the final thermoplastic matrix and of the composite which results therefrom being affected. The crystallinity of said polymer must be as high as possible, but with a melting temperature Tm which is not too high (Tm≤280° C. and more particularly ≤270° C.) so as to optimize the mechanical performance levels and the crystallization rate and/or the crystallization temperature as high as possible, this being in order to reduce the molding time before ejection of the molded composite part with a selective choice of the composition of said semi-crystalline polyamide. Therefore, the subject of the present invention is the processing of novel specific compositions of thermoplastic composite, in particular based on semi-crystalline polyamide, having a good compromise between high mechanical performance levels (mechanical strength), in particular under hot conditions, and easy processing. This means that the objective is compositions which are easy to process with transformation and processing temperatures lower than those for other compositions of the prior art, with a more favorable overall processing energy balance, a shorter cycle time and a higher productivity. More particularly, the solution of the invention, in the case of reactive compositions, allows, by using compositions based on semi-crystalline reactive polyamide prepolymers, both rapid reaction kinetics and rapid crystallization kinetics with a shorter cycle time. More particularly, the polyamide polymer matrix, while having a high Tg and a limited Tm as defined, with easy processing of said composite, must also have a high crystallization rate, characterized first by a difference between melting temperature and crystallization temperature Tm–Tc which does not exceed 50° C., preferably which does not exceed 40° C. and more particularly which does not exceed 30° C. More preferentially, this Tm–Tc difference does not exceed 30° C., unless Tm–Tg is <150° C., in which case (Tm–Tg<150° C.) the difference Tm–Tc can vary up to 50° C. The mechanical performance levels or mechanical strength under hot conditions of the composite can be evaluated by the variation in the mechanical modulus between ambient temperature (23° C.) and 100° C. with the mechanical performance levels, in terms of modulus, being maintained at at least 75% compared with those at ambient temperature (23° C.). Therefore, the object of the invention is to develop a polyamide composition which satisfies these needs.

Therefore, the first subject of the invention relates to a specific composition of semi-crystalline polyamide (PA) for a thermoplastic composite material or a thermoplastic composite material composition, with a thermoplastic matrix having a Tg of at least 90° C. and a Tm below or equal to 280° C., preferably below 280° C. This composition may be reactive by means of prepolymers which are reactive with one another by condensation or with a chain extender by polyaddition and without elimination of volatile by-products. It may as an alternative be a nonreactive composition based on polyamide polymers corresponding to the final polymer of the thermoplastic matrix. Said specific composition is based on the selective choice of at least two amide units A and B which are different and at specific molar proportions with the optional presence of at least a third (C) and optionally of a fourth (D) amide unit, these units being different than one another.

A second subject of the invention relates to a specific process for manufacturing said thermoplastic composite material and more particularly for manufacturing mechanical parts or structural parts based on said composite material.

The present invention also relates to the thermoplastic polymer of the thermoplastic matrix of said composite material.

Another subject of the invention relates to the use of the specific composition of PA of the invention for manufacturing a thermoplastic composite material of the same composition and more particularly mechanical or structural parts based on this material.

Another subject of the invention relates to the thermoplastic composite material which results from said composition for composite material.

Finally, the invention covers a mechanical part or structural part based on composite material obtained by means of the specific process of the invention or which results from the use of the specific composition of PA of the invention.

DETAILED DESCRIPTION

Therefore, the first subject relates to a composition for thermoplastic composite material or a composition of thermoplastic composite material, said composite material comprising reinforcing fibers or in other words a fibrous reinforcement, and a thermoplastic matrix which impregnates said fibers (or said fibrous reinforcement), said matrix being based on at least one thermoplastic polymer, with, with regard to said composition:

said matrix thermoplastic polymer being a semi-crystalline polyamide polymer with a glass transition temperature Tg of at least 90° C., preferably of at least 100° C., more preferentially of at least 110° C., even more preferentially 120° C., and a melting temperature Tm below or equal to 280° C., in particular below 280° C., preferably below or equal to 270° C., in particular ranging from 220 to 270° C., said composition comprising, in addition to said reinforcing fibers:
  a) a reactive composition comprising or consisting of at least one reactive polyamide prepolymer (or oligomer, with oligomer and prepolymer meaning the same thing in the remainder of the text), said composition being a composition which is a precursor of said polyamide polymer of said matrix,
  or as an alternative to a)
  b) a nonreactive composition of at least one polyamide polymer, said composition being that of said thermoplastic matrix with the Tg and the Tm as defined above,
  and with:

said composition a) or b) comprising or consisting of one or more polyamides, including random or blocked copolyamides, which are prepolymers (or oligomers) according to a) or which are polymers according to b) and which comprise different amide units A and B and, optionally, different amide units C and D, selected as follows:

A: is a major amide unit present at a molar content ranging from 55% to 95%, preferably from 55% to 85%, more preferentially from 55% to 80%, even more preferentially from 55% to 75%, in particular from 55% to 70%, chosen from x.T units, where x is a $C_9$ to $C_{18}$, preferably $C_9$, $C_{10}$, $C_{11}$, $C_{12}$, linear aliphatic diamine and where T is terephthalic acid, B: is an amide unit different than A, which unit B is present at a molar content ranging from 5% to 45%, preferably from 15% to 45%, more preferentially from 20% to 45%, even more preferentially from 25% to 45%, in particular from 30% to 45%, according to the Tm of the polyamide based on unit A and with said amide unit B being chosen from x'.T units, where x' is chosen from:
  B1) a branched aliphatic diamine bearing a single methyl or ethyl, preferably methyl, branching, in particular 2-methylpentamethylenediamine (MPMD) or 2-methyloctamethylenediamine (MOMD), and having a main chain length which is different by at least two carbon atoms compared with the main chain length of the diamine x of said associated unit A, preferably x' (according to B1)) being MPMD, or
  B2) m-xylylenediamine (MXD) or
  B3) a $C_4$ to $C_{18}$ linear aliphatic diamine when, in said unit A, said diamine x is a $C_{11}$ to $C_{18}$ linear aliphatic diamine and x' is a $C_9$ to $C_{18}$ diamine when, in said unit A, said diamine x is a $C_9$ or $C_{10}$ diamine, preferably with a difference of at least two carbon atoms between the chain of diamine x of said unit A and the chain of diamine x' of said unit B, and preferably, said unit B is chosen from x'.T units, where x' is MPMD according to option B1) or MXD according to option B2) or a linear aliphatic diamine as defined above according to option B3) or more preferentially x' is MPMD according to B1) or MXD according to B2) and even more preferentially x' is MXD according to B2), C: optional amide unit different than A and than B and chosen from amide units based on (meaning comprising) a cycloaliphatic and/or aromatic structure or based on x'T as defined above for B but with x' being different than x' for the unit B, D: optional amide unit different than A, than B and than C, when C is present, and chosen from the aliphatic amide units derived from:
   amino acids or lactams which are $C_6$ to $C_{12}$, preferably $C_6$, $C_{11}$ and $C_{12}$, or mixtures thereof, or
   the reaction of a $C_6$ to $C_{18}$, preferably $C_6$ to $C_{12}$, linear aliphatic diacid and of a $C_6$ to $C_{18}$, preferably $C_6$ to $C_{12}$ linear aliphatic diamine, or mixtures thereof,
and under the condition that the sum of the molar contents A+B+C+D is equal to 100%.

The sum of the molar contents in the absence of C and D amounts to A+B=100%, with A and B being complementary to 100%. If C is present without D, in this case the sum amounts to A+B+C=100%. If only D is present without C, said sum of 100% corresponds to A+B+D.

Said composition is more particularly a composition for thermoplastic composite material. This means that it makes it possible to obtain a thermoplastic composite material.

According to a first possibility in said composition of the invention, said polyamide, which is a polymer or prepolymer, comprises said amide unit according to C, different than A or than B, or the unit C as defined above is present and partially replaces B and is at a molar content ranging up to 25%, preferably up to 20%, more preferentially up to 15% relative to said unit B.

When the unit C is present and corresponds to x'T with x' as defined above for the unit B, in this case C being different than B by definition, said unit C may be based on x' which is defined according to B1, and in this case, said unit B can have x' defined according to either B2 or B3. If C is based on x' according to B2, in this case the unit B can be based on x' which is according to B1 or B3. If C is based on x' according to B3, in this case the unit B can be based on x' which is defined according to B1 or B2.

More particularly, in this unit C of said composition, said aromatic structure can be chosen, for example, from the isophthalic and/or naphthalenic structure. A terephthalic structure is possible in particular for the diacid component when the diamine is cycloaliphatic. Said cycloaliphatic structure can be chosen from a structure based on a cyclohexane ring or a structure based on a decahydronaphthalenic ring (hydrogenated naphthalenic structure).

Preferably, the structure of C is derived from an aliphatic amine and from a cycloaliphatic and/or aromatic diacid, for example as defined above, or from a diacid and from a cycloaliphatic diamine, for example as defined above. More particularly, said unit C is chosen from the units derived:
   from a cycloaliphatic diamine and from terephthalic acid or
   from a diacid chosen from isophthalic acid and naphthenic acid or based on cyclohexane and on a diamine x or x' as defined above for the units A and B respectively.

According to another variant of the composition of the invention, said unit D is present and partially replaces B at a molar content which can range up to 70%, preferably up to 15%, relative to said unit B. Therefore, according to this variant, said composition comprises said unit D as defined above, in particular chosen from: amino acids or lactams which are $C_6$ to $C_{12}$, preferably $C_6$, $C_{11}$ and $C_{12}$, or mixtures thereof, or the units resulting from the reaction of a $C_6$ to $C_{18}$, preferably a $C_6$ to $C_{12}$, linear aliphatic diacid and of a $C_6$ to $C_{18}$, preferably $C_6$ to $C_{12}$, linear aliphatic diamine, and preferably with the units A and B being respectively based on diamines x and x' as defined above.

Preferably, the unit C and/or D, when it is present, partially replaces the unit B with a (C+D) molar content up to 70% and preferably less than 40% relative to the molar content of said unit B as defined according to the invention. Therefore, a part of the unit B as defined according to the invention, which represents less than 50 mol %, preferably less than 40 mol %, relative to B, can be replaced with a unit C and/or D as defined above according to the invention.

More particularly, the difference Tm−Tc, between the melting temperature Tm and the crystallization temperature Tc of said matrix (polyamide) polymer, does not exceed 50° C., preferably does not exceed 40° C. and more particularly does not exceed 30° C.

In particular, Tm−Tc does not exceed 30° C. unless Tm−Tg is less than 150° C., in which case Tm−Tc can range up to 50° C.

According to one particular option, the enthalpy of crystallization of said matrix polymer, measured by differential scanning calorimetry (DSC) according to standard ISO 11357-3, is greater than 40 J/g, preferably greater than 45 J/g.

Preferably, said amide unit A, as defined according to the invention above and below, is present at a molar content ranging from 55% to 80%, more preferentially from 55% to 75%, even more preferentially from 55% to 70%, relative to all the units of said (polyamide) matrix polymer as defined above according to the invention.

According to a first preferred option of the composition according to the invention described above, said composition has a unit B with x' defined according to option B1 described above, in particular with MPMD being the diamine more preferred for said unit B. The unit A remains as defined above, i.e. x.T, with x being a $C_9$ to $C_{18}$, preferably $C_9$, $C_{10}$, $C_{11}$ or $C_{12}$, linear aliphatic diamine.

According to a second preferred option of said composition, the latter has a unit B where x' is MXDA according to option B2 defined above. The unit A remains as defined for the first option mentioned. This second option constitutes, together with the first mentioned above, the most preferred of the invention and in particular the second option is the most preferred of the invention.

A third preferred option is the one where B is defined according to option B1 or B2 or B3 as defined above and with the presence of a unit C as defined above as a replacement for B and up to 25 mol %, preferably up to 20 mol %, more preferentially up to 15 mol % and in particular with B being defined according to the first or second option as defined above.

Even more preferentially, said polyamide composition is based on the units A and B selected as follows:
   for the unit A being 9T, said unit B is selected from: 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferentially MPMD.T or MXD.T, with a molar content of B ranging from 30% to 45%,
   for the unit A being 10T, said unit B is selected from: 9T, 11T, 12T, 13T, 14T, 15T, 16T, 17T and 18T, MPMD.T and MXD.T, preferably 12T, 13T, 14T, 15T, 16T, 17T and 18T, MPMD.T and MXD.T, more preferentially MPMD.T or MXD.T, with a molar content of B ranging from 25% to 45%,
   for the unit A being 11T, said unit B is selected from: 9T, 10T, 12T, 13T, 14T, 15T, 16T, 17T and 18T, MPMD.T and MXD.T, preferably 9T, 13T, 15T, 16T, 17T and 18T, MPMD.T and MXD.T, more preferentially MPMD.T or MXD.T, with a molar content of B ranging from 20% to 45%, for the unit A being 12T, said unit B is selected from: 9T, 10T, 11T, 13T, 14T, 15T, 16T, 17T and 18T, MPMD.T and MXD.T, preferably 9T, 10T, 14T, 15T, 16T, 17T and 18T, MPMD.T and MXD.T, more preferentially MPMD.T or MXD.T, with a molar content of B ranging from 20% to 45%.

According to this selection, a first more particular composition of the invention can be defined, with the unit A being a 9T unit and the unit B being selected from: 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferentially MPMD.T or MXD.T, with a molar content of B ranging from 30% to 45%. A second particular composition corresponds to a unit A being a 10T unit and the unit B being selected from: 9T, 11T, 12T, 13T, 14T, 15T, 16T, 17T and 18T, MPMD.T and MXD.T, preferably 12T, 13T, 14T, 15T, 16T, 17T and 18T, MPMD.T and MXD.T, more preferentially MPMD.T or MXD.T, with a molar content of B ranging from 25% to 45%. A third particular composition corresponds to a unit A being an 11T unit and the unit B being selected from: 9T, 10T, 12T, 13T, 14T, 15T, 16T, 17T and 18T, MPMD.T and MXD.T, preferably 9T, 13T, 15T, 16T, 17T and 18T, MPMD.T and MXD.T, more preferentially MPMD.T or MXD.T, with a molar content of B ranging from 20% to 45%. Finally, another particular composition corresponds to a unit A being a 12T unit and the unit B being selected from: 9T, 10T, 11T, 13T, 14T, 15T, 16T, 17T and 18T, MPMD.T and MXD.T, preferably 9T, 10T, 14T, 15T, 16T, 17T and 18T, MPMD.T and MXD.T, more preferentially MPMD.T or MXD.T, with a molar content of B ranging from 20% to 45%.

With regard to the reactivity or nonreactivity of said polyamide composition, according to a first option, said polyamide composition may be a nonreactive composition according to b). This means that said composition is the same as that of the matrix (polyamide) polymer of said composite since there is an absence of reaction in this composition, which remains stable and does not change in terms of molecular weight when it is heated for the processing of the composite material of the invention. The characteristics of the polyamide polymer in this composition are the same, with Tg and Tm as already defined above, as those of the final polymer which is the semi-crystalline polyamide obtained by means of a reactive composition a) (see below), said polymer constituting by definition said thermoplastic matrix of said composite. The polyamides according to b) are obtained by conventional polycondensation reaction from the monomer components which are diamines, diacids and, optionally, amino acids or lactams, with the proportion and nature of the monomers being chosen according to the selected units of the invention, A and B and, optionally, C and D.

The number-average molecular weight Mn of said final (polyamide) polymer of the thermoplastic matrix of said composite is preferably in a range of from 10 000 to 40 000, preferably from 12 000 to 30 000. These Mn values can correspond to intrinsic viscosities greater than or equal to 0.8. These polyamides according to the composition b) are nonreactive, either because of the low content of reactive (residual) functions present, in particular with a content of said functions <120 meq/kg, or because of the presence of the same type of end functions at the end of the chain, which are therefore not reactive with one another, or because of the modification and blocking of said reactive functions by a monofunctional reactive component, for example for the amine functions by modification reaction with a monoacid or a monoisocyanate, and for carboxy functions by reaction with a monoamine. When said final matrix polymer is derived from a reactive prepolymer in a reactive precursor composition a), this reactive prepolymer has a Mn at least two times lower than that of said final matrix polymer.

According to a second option, said polyamide composition may be a reactive composition of prepolymer according to a) and which is a precursor or precursor composition of said polyamide polymer of said matrix of the composite.

It is possible to distinguish three more particular possibilities in this second option, according to the reactive composition a). According to a first possibility, said composition a) may comprise or consist of at least one reactive (polyamide) prepolymer bearing, on the same chain (i.e. on the same prepolymer), two end functions X' et Y', said functions being respectively coreactive with one another by condensation, with X' and Y' being amine and carboxy or carboxy and amine respectively. According to a second possibility, said reactive composition a) can comprise or consist of at least two polyamide prepolymers which are reactive with one another and each bear respectively two end functions X' or Y', which are identical (identical for the same prepolymer and different between the two prepolymers), it being possible for said function X' of a prepolymer to react only with said function Y' of the other prepolymer, in particular by condensation, more particularly with X' and Y' being amine and carboxy or carboxy and amine respectively. This condensation (or polycondensation) reaction can bring about the elimination of by-products. The latter can be eliminated by preferably working according to a process using an open-mold technology. In the case of a closed-mold process, a step of degassing, preferably under vacuum, the by-products eliminated by the reaction is present, in order to avoid the formation of microbubbles of the by-products in the final composite material, which (microbubbles) can affect the mechanical performance levels of said material if they are not eliminated in this way. According to a third option of reactive composition a), said composition a) or precursor composition a) can comprise or consist of:

a1) at least one prepolymer of said thermoplastic polyamide polymer (of the matrix) as already defined above, with this prepolymer bearing n identical reactive end functions X, chosen from: —$NH_2$ (amine), —$CO_2H$ (carboxy) and —OH (hydroxyl), preferably —$NH_2$ (amine) and —$CO_2H$ (carboxy), with n being 1 to 3, preferably from 1 to 2, more preferentially 1 or 2, more particularly 2;

a2) at least one chain extender Y-A'-Y, with A' being a hydrocarbon-based diradical of nonpolymeric structure (neither polymer, nor oligomer, nor prepolymer), bearing 2 identical reactive end functions Y, which are reactive, by polyaddition (without reaction by-product elimination), with at least one function X of said prepolymer a1), preferably having a molecular weight of less than 500 and more preferentially less than 400. $NH_2$ (amine) signifies primary and secondary amine.

In the latter case (third option), the semi-crystalline structure of said polyamide polymer of the matrix of said composite is essentially provided by the structure of said prepolymer a1) which is also semi-crystalline.

As suitable examples of extenders a2) according to the functions X borne by said semi-crystalline polyamide prepolymer a1), mention may be made of the following:

when X is NH$_2$ or OH, preferably NH$_2$:
either the chain extender Y-A'-Y corresponds to
Y chosen from the groups: maleimide, optionally blocked isocyanate, oxazinone, oxazolinone, preferably oxazinone and oxazolinone, and
A' is a carbon-based spacer or carbon-based radical bearing the reactive functions or groups Y, chosen from:
a covalent bond between two functions (groups) Y in the case where Y=oxazinone and oxazolinone, or
an aliphatic hydrocarbon-based chain or an aromatic and/or cycloaliphatic hydrocarbon-based chain, the latter two comprising at least one ring containing 5 or 6 carbon atoms which is optionally substituted, with optionally said aliphatic hydrocarbon-based chain optionally having a molecular weight of 14 to 200 g·mol$^{-1}$;
or the chain extender Y-A'-Y corresponds to Y being a caprolactam group and to A' possibly being a carbonyl radical such as carbonyl biscaprolactam or to A' possibly being a terephthaloyl or an isophthaloyl;
or said chain extender Y-A'-Y bears a cyclic anhydride group Y and this extender is preferably chosen from a cycloaliphatic and/or aromatic carboxylic dianhydride and more preferentially it is chosen from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3',4,4'-benzophenonetetracarboxylic dianhydride, 1,2,3,4-cyclobutanetetracarboxylic dianhydride, hexafluoroisopropylidenebisphthalic dianhydride, 9,9-bis(trifluoromethyl)xanthenetetracarboxylic dianhydride, 3,3',4,4'-diphenylsulfonetetracarboxylic dianhydride, bicyclo[2.2.2]oct-7-ene-2,3,5,6-tetracarboxylic dianhydride, 1,2,3,4-cyclopentanetetracarboxylic dianhydride, 3,3',4,4'-diphenyl ether tetracarboxylic dianhydride, or mixtures thereof, and
when X is COOH:
said chain extender Y-A'-Y corresponds to:
Y chosen from the groups: oxazoline, oxazine, imidazoline or aziridine, such as 1, 1'-iso- or terephthaloyl-bis(2-methylaziridine),
A' being a carbon-based spacer (radical) as defined above.

More particularly, when, in said extender Y-A'-Y, said function Y is chosen from oxazinone, oxazolinone, oxazine, oxazoline or imidazoline, in this case, in the chain extender represented by Y-A'-Y, A' can represent an alkylene such as —(CH$_2$)$_m$— with m ranging from 1 to 14 and preferably from 2 to 10, or A' can represent a cycloalkylene and/or an arylene which is substituted (alkyl) or unsubstituted, for instance benzenic arylenes, such as o-, m-, p-phenylenes, or naphthalenic arylenes and preferably A' is an arylene and/or a cycloalkylene.

In the case of carbonyl- or terephthaloyl- or isophthaloyl-biscaprolactam as chain extender Y-A'-Y, the preferred conditions prevent the elimination of by-product, for instance caprolactam during said polymerization and processing in the molten state.

In the optional case mentioned above where Y represents a blocked isocyanate function, this blocking can be obtained with blocking agents for the isocyanate function, for instance epsilon-caprolactam, methyl ethyl ketoxime, dimethylpyrazole or diethyl malonate.

Likewise, in the case where the extender is a dianhydride which reacts with a prepolymer P(X)n where X=NH$_2$, the preferred conditions prevent any formation of imide ring during the polymerization and during the processing in the molten state.

For X=OH or NH$_2$, the Y group is preferably chosen from: (nonblocked) isocyanate, oxazinone and oxazolinone, more preferentially oxazinone and oxazolinone, with, as spacer (radical), A' being as defined above.

As examples of chain extenders bearing oxazoline or oxazine reactive functions Y suitable for implementation of the invention, reference may be made to those described under references "A", "B", "C" and "D" on page 7 of application EP 0 581 642, and also to their preparation processes and their modes of reaction which are set out therein. "A" in said document is bisoxazoline, "B" is bisoxazine, "C" is 1,3-phenylenebisoxazoline and "D" is 1,4-phenylenebisoxazoline.

As examples of chain extenders with an imidazoline reactive function Y that are suitable for the implementation of the invention, reference may be made to those described ("A" to "F") on pages 7 to 8 and table 1 of page 10, in application EP 0 739 924, and also to their preparation processes and their modes of reaction which are set out therein.

As examples of chain extenders with a reactive function Y=oxazinone or oxazolinone which are suitable for the implementation of the invention, reference may be made to those described under references "A" to "D" on pages 7 to 8 of application EP 0 581 641, and also to their preparation processes and their modes of reaction which are set out therein.

As examples of suitable oxazinone (ring comprising six atoms) and oxazolinone (ring comprising five atoms) Y groups, mention may be made of the Y groups derived from: benzoxazinone, oxazinone or oxazolinone, it being possible for spacer A' to be a single covalent bond with respective corresponding extenders being: bis(benzoxazinone), bisoxazinone and bisoxazolinone.

A' can also be a C$_1$ to C$_{14}$, preferably C$_2$ to C$_{10}$ alkylene, but A' is preferably an arylene and more particularly it can be a phenylene (substituted with Y in positions 1,2 or 1,3 or 1,4) or a naphthalene radical (disubstituted with Y) or a phthaloyle (iso- or terephthaloyle) or A' can be a cycloalkylene.

For the Y functions chosen from oxazine (6-membered ring), oxazoline (5-membered ring) and imidazoline (5-membered ring), the A' radical may be as described above with it being possible for A' to be a single covalent bond and with the respective corresponding extenders being: bisoxazine, bisoxazoline and bisimidazoline. A' may also be a C$_1$ to C$_{14}$, preferably C$_2$ to C$_{10}$, alkylene. The A' radical is preferably an arylene and, more particularly, it may be a phenylene (substituted with Y in positions 1,2 or 1,3 or 1,4) or a naphthalene radical (disubstituted with Y) or a phthaloyle (iso- or terephthaloyle), or A' may be a cycloalkylene.

In the case where Y=aziridine (nitrogenous heterocycle comprising three atoms equivalent to ethylene oxide with the ether —O— being replaced with —NH—), the A' radical may be a phthaloyle (1,1'-iso- or terephthaloyle) with, as example of extender of this type, 1,1'-isophthaloylbis(2-methylaziridine).

The presence of a catalyst of the reaction between said prepolymer P(X)n and said extender Y-A'-Y at a content ranging from 0.001% to 2%, preferably from 0.01% to 0.5%, relative to the total weight of two mentioned coreactants, can accelerate the (poly)addition reaction and thus shorten the production cycle. Such a catalyst can be chosen from: 4,4'-dimethylaminopyridine, p-toluenesulfonic acid, phosphoric acid, NaOH and optionally those described for a polycondensation or transesterification, as described in EP 0 425 341, page 9, lines 1 to 7.

According to a more specific case of the choice of said extender, A' may represent an alkylene, such as —$(CH_2)_m$— with m ranging from 1 to 14 and preferably from 2 to 10, or represents an alkyl-substituted or unsubstituted arylene, such as benzenic arylenes (such as o-, m- or p-phenylenes), or naphthalenic arylenes (with arylenes: naphthylenes). Preferably, A' represents a substituted or unsubstituted arylene which can be benzenic or naphthenic.

As already specified, said chain extender (a2) has a nonpolymeric structure and preferably a molecular weight of less than 500, more preferentially less than 400.

Said reactive prepolymers of said reactive composition a), according to the three options mentioned above, have a number-average molecular weight Mn ranging from 500 to 10 000, preferably from 1000 to 6000. All the Mn weights are determined by calculation from the end function content determined by potentiometric titration in solution and the functionality of said prepolymers.

In the case of the reactive compositions of the invention according to definition a), said reactive prepolymers are prepared by conventional polycondensation reaction between the corresponding diamine and diacid components and optionally (according to the unit D) amino acid or lactam components while adhering to the nature and proportions of the units A and B and optionally C and D according to the invention. The prepolymers bearing amine and carboxy functions X' and Y' on the same chain can be obtained, for example, by adding a combination of monomers (amino acid, diamine, diacid) having in total an equal amount of amine and carboxy units. Another route for obtaining these prepolymers bearing a function X' and a Y' is, for example, by combining a prepolymer bearing two identical functions X'=amine, with a diacid prepolymer bearing Y': carboxy, with an overall molar content of acid functions equal to that of the starting amine functions X'.

In order to obtain prepolymers functionalized with identical (amine or carboxy) functions on the same chain, it is sufficient to have an excess of diamines (or overall of amine functions) in order to have amine end functions or an excess of diacid (or overall of carboxy functions) in order to have carboxy end functions.

In the case of a prepolymer P(X)n with n identical functions X, the functionality 1 can be obtained in the presence of a blocking monofunctional component (monoacid or monoamine depending on the nature of X=amine or carboxy).

A functionality n=2 can be obtained from difunctional components: diamines and diacids with excess of one in order to fix X according to this excess.

For n=3, for example, for a prepolymer P(X)n, the presence of a trifunctional component is necessary, for example the presence of a triamine (one mole per prepolymer chain) with a diamine in the reaction with a diacid. The preferred functionality for P(X)n is n=2.

The reinforcing fibers or fibrous reinforcement may be an assembly of fibers, preferably of long fibers, i.e. having an aspect ratio defined by the ratio of the length to the diameter of the fiber, which means that these fibers have a circular cross section, greater than 1000, preferably greater than 2000. In this assembly, the fibers may be continuous, in the form of a unidirectional (UD) or multidirectional (2D, 3D) reinforcement. In particular, they may be in the form of cloths, sheets, strips or plaits and can also be cut up, for example in the form of nonwovens (mats) or in the form of felts.

These reinforcing fibers can be chosen from:
mineral fibers, these having high melting temperatures Tm' above the melting temperature Tm of said semi-crystalline polyamide of the invention and above the polymerization and/or processing temperature,
polymeric or polymer fibers having a melting temperature Tm' or, failing the Tm', a glass transition temperature Tg', above the polymerization temperature or above the melting temperature Tm of said semi-crystalline polyamide constituting said matrix of the composite and above the processing temperature,
or mixtures of the abovementioned fibers.

As mineral fibers suitable for the invention, mention may be made of carbon fibers, which includes fibers of nanotubes or carbon nanotubes (CNTs), carbon nanofibers or graphenes; silica fibers, such as glass fibers, in particular of E, R or S2 type; boron fibers; ceramic fibers, in particular silicon carbide fibers, boron carbide fibers, boron carbonitride fibers, silicon nitride fibers, boron nitride fibers, basalt fibers; fibers or filaments based on metals and/or alloys thereof; fibers of metal oxides, in particular of alumina ($Al_2O_3$); metalized fibers, such as metalized glass fibers and metalized carbon fibers, or mixtures of the abovementioned fibers.

More particularly, these fibers can be chosen as follows:
the mineral fibers can be chosen from: carbon fibers, carbon nanotube fibers, glass fibers, in particular of E, R or S2 type, boron fibers, ceramic fibers, in particular silicon carbide fibers, boron carbide fibers, boron carbonitride fibers, silicon nitride fibers, boron nitride fibers, basalt fibers, fibers or filaments based on metals and/or alloys thereof, fibers based on metal oxides, such as $Al_2O_3$, metalized fibers, such as metalized glass fibers and metalized carbon fibers, or mixtures of the abovementioned fibers, and
the polymer or polymeric fibers, under the abovementioned condition, are chosen from:
fibers of thermosetting polymers, more particularly chosen from: unsaturated polyesters, epoxy resins, vinyl esters, phenolic resins, polyurethanes, cyanoacrylates and polyimides, such as bismaleimide resins, aminoplasts resulting from the reaction of an amine such as melamine with an aldehyde such as glyoxal or formaldehyde,
fibers of thermoplastic polymers, more particularly chosen from: polyethylene terephthalate (PET), polybutylene terephthalate (PBT), high-density polyolefins such as polyethylene (PET), polypropylene (PP) and PET/PP copolymers, PVOH (polyvinyl alcohol),
fibers of polyamides corresponding to one of the formulae: 6, 11, 12, 6.10, 6.12, 6.6, 4.6,
fibers of aramids (such as Kevlar®) and aromatic polyamides, such as those corresponding to one of the formulae: PPD.T, MPD.I, PAA and PPA, with PPD and MPD being respectively p- and m-phenylenediamine, PAA being polyarylamides and PPA being polyphthalamides,
fibers of block copolymers of polyamide, such as polyamide/polyether, or fibers of polyaryl ether ketones (PAEKs) such as polyether ether ketone (PEEK), polyether ketone ketone (PEKK) or polyether ketone ether ketone ketone (PEKEKK).

The preferred reinforcing fibers are long fibers (with a circular cross section) chosen from: carbon fibers, including metalized carbon fibers, glass fibers, including metalized glass fibers of E, R or S2 type, fibers of aramids (such as Kevlar®) or of aromatic polyamides, fibers of polyaryl ether ketones (PAEKs), such as polyether ether ketone (PEEK), fibers of polyether ketone ketone (PEKK), fibers of polyether ketone ether ketone ketone (PEKEKK), or mixtures thereof.

The fibers more particularly preferred are chosen from: glass fibers, carbon fibers, ceramic fibers and aramid (such as Kevlar®) fibers, or mixtures thereof. These fibers have a circular cross section.

Said fibers can represent contents of 40% to 70% by volume and preferably of 50% to 65% by volume of said composite material.

The assembly of fibers can be random (mat), unidirectional (UD) or multidirectional (2D, 3D or the like). Its grammage, i.e. its weight per square meter, can range from 100 to 1000 g/m$^2$, preferably from 200 to 700 g/m$^2$. The fibers can be in woven or nonwoven form, in particular in the form of reinforcing cloths and fabrics. They can in particular be assembled and linked in the form of a preform already having the shape of the final part. As suitable linking agent, use may be made of a composition according to a) or b) and, failing this, a linking agent compatible with said composition (composition a) or b)).

The composition according to the invention comprises a fibrous reinforcement based on fibers, preferably long fibers, in particular with L/D greater than 1000, preferably greater than 2000, and more particularly selected from glass fibers, carbon fibers, ceramic fibers, aramid fibers, or mixtures thereof.

More particularly, the composition according to the invention is a molding composition. As such, it may comprise, in addition to the preferably long, reinforcing fibers, other fillers and additives.

Among the suitable fillers, mention may be made, for example, of: inorganic or organic fillers: carbon black, carbon nanotubes (CNTs), carbon nanofibrils, glass beads, ground recycled polymers in the powder form.

Among the suitable additives, mention may be made of: additives which absorb in the UV or IR range so as to allow welding of the composite obtained, by (UV or IR) laser technology, and heat stabilizers chosen from antioxidants of sterically hindered phenol or sterically hindered amine type (HALS). The function of these stabilizers is to prevent thermal oxidation and sizable photooxidation and degradation of the matrix polyamide of the composite obtained.

The second subject of the invention relates to a process for manufacturing a thermoplastic composite material, in particular a mechanical part or a structural part based on said material, having the composition as defined according to the invention as set out above, said process comprising at least one step of polymerization of at least one reactive composition a) as defined above according to the invention or a step of molding or processing at least one nonreactive composition b) as defined above according to the invention.

More particularly, said process may comprise the following steps:
i) impregnation in the molten state of a fibrous reinforcement with a composition as defined above according to the invention but not comprising said fibrous reinforcement, in an open or closed mold or outside the mold, in order to obtain a composition as defined according to the invention, i.e. with impregnated fibrous reinforcement, ii) polymerization reaction by heating said composition of step i), in the case of a polyamide reactive composition a) as defined according to the invention, with chain extension (increase in molecular weight), as appropriate, by polycondensation reaction (including self-condensation of the same prepolymer), or by polyaddition reaction, in bulk in the molten state, with, in the case of polycondensation, elimination under vacuum of the condensation products when a closed mold is involved, using a vacuum extraction system, otherwise and preferably with the polycondensation being carried out in an open mold or outside the mold, iii) processing or molding of said composition of step i), in the case of a nonreactive polyamide composition b) as defined according to the invention, so as to form the final composite part in a mold or with another processing system and in the case of a reactive composition a), a processing step by molding or by means of another processing system and simultaneously with the polymerization step ii).

In said process according to the invention, said processing can preferably be carried out according to an RTM, S-RIM, injection-compression or pultrusion process or by infusion, in particular in the case of a reactive composition a).

Another subject, also covered by the present invention, relates to the semi-crystalline polyamide thermoplastic polymer, in particular the polymer which corresponds to the (or is the) polymer of the thermoplastic matrix of said thermoplastic composite material of the present invention, said polymer being a nonreactive polymer as defined according to composition b) defined above or a polymer which can be obtained from said reactive composition a) as defined above according to the present invention. This thermoplastic polymer is by definition one of the essential components of the composition of the thermoplastic composite material of the present invention and is therefore part of the invention as a product linked to the present invention with the same common inventive concept in the face of the same technical problem to be solved. The invention therefore also covers the use of said thermoplastic polymer according to the invention as thermoplastic matrix of a thermoplastic composite based on a fibrous reinforcement as described above. More particularly preferred are the polymers corresponding to the polyamide compositions as defined according to the first preferred composition option, with B being defined according to option B1), or the second option with B defined according to option B2) or according to the third preferred composition option, where B is defined according to options B1) or B2) and C is present as defined above.

Another subject of the invention relates to the use of a composition as defined above according to the invention or the use of a semi-crystalline polyamide polymer according to the invention, for manufacturing a thermoplastic composite material, more particularly a mechanical part or a structural part (including structural and semi-structural part) based on said composition or on said composite material.

According to a more particular use, said mechanical parts or structural parts made of said composite material concern applications in the following fields: the motor vehicle industry, the railroad industry, the marine industry, wind power, photovoltaics, the solar industry, including solar panels and components for solar power stations, sports, aeronautics and space, road transport (concerning trucks), the construction industry, civil engineering, panels, or leisure.

More particularly, three more preferred applications can be distinguished according to the temperature for use of said parts made of composite material according to the invention:

in wind power, with a Tg of said thermoplastic matrix polyamide of at least 90° C.,
in the motor vehicle industry, with a Tg of said polyamide of at least 100° C.,
in aeronautics, with a Tg of said polyamide of at least 120° C.

This means that, for a Tg of at least 100° C., there can be two possible applications: the motor vehicle industry and wind power, and if the Tg is at least 120° C., there may also be, in addition to aeronautics as application, wind power and the motor vehicle industry.

The present invention also covers a thermoplastic composite material resulting from the use of at least one composition for thermoplastic composite material as defined above according to the present invention.

Lastly, the invention relates to a mechanical part or a structural part made of thermoplastic composite material, which results from the use of at least one composition of the invention as defined above or from the use of a semicrystalline polyamide polymer as defined according to the invention or of a thermoplastic composite material as defined above, or which part is obtained by means of a process as defined above according to the invention.

More particularly, said structural part is a motor vehicle part post-treated by cataphoresis, in particular with a Tg of at least 90° C.

According to another option, it is a part for wind power, in particular with a Tg of at least 100° C.

According to a third particular option, it is a part for aeronautics, in particular with a Tg of at least 120° C.

METHODS FOR DETERMINING THE CHARACTERISTICS MENTIONED

The melt viscosity of the prepolymer or of the precursor composition is measured according to the reference manual of the constructor of the measuring instrument used, which is a Physica MCR301 rheometer, under nitrogen flushing at the temperature given under a shear of 100 s$^{-1}$, between two parallel planes 50 mm in diameter.

The Mn of the thermoplastic prepolymer or polymer is determined from the titration (quantitative determination) of the end functions according to a potentiometric method (direct quantitative determination for $NH_2$ or carboxy) and from the theoretical functionality which is 2 (in end functions) for linear prepolymers and polymers prepared from only bifunctional monomers.

The measurement of the intrinsic or inherent viscosity is carried out in m-cresol. The method is well known to those skilled in the art. Standard ISO 937 is followed, but with the solvent being changed (use of m-cresol in place of sulfuric acid and the temperature being 20° C.).

The glass transition temperature Tg of the thermoplastic polymers used is measured using a differential scanning calorimeter (DSC), after a second heating pass, according to standard ISO 11357-2. The heating and cooling rate is 20° C./min.

The melting temperature Tm and the crystallization temperature Tc are measured by DSC, after a first heating, according to standard ISO 11357-3. The heating and cooling rate is 20° C./min.

The enthalpy of crystallization of said matrix polymer is measured by differential scanning calorimetry (DSC) according to standard ISO 11357-3.

EXAMPLES

A—Preparation of a Polyamide Polymer Via the Direct Route (Without Chain Extension of a Reactive Prepolymer)

5 kg of the following starting materials are placed in a 14-liter autoclave reactor:
- 500 g of water,
- the diamine(s),
- the amino acid (optionally),
- the diacid(s),
- the monofunctional chain regulator: benzoic acid in an amount suitable for the Mn targeted and varying (benzoic acid) from 50 to 100 g,
- 35 g of sodium hypophosphite in solution,
- 0.1 g of a Wacker AK1000 antifoam (the company Wacker Silicones).

The nature and molar ratios of the molecular units and structures of the polyamides (by referenced test) are given in table 1 below.

The closed reactor is purged of its residual oxygen and then heated at a temperature of 230° C. with respect to the material introduced. After stirring for 30 minutes under these conditions, the pressurized vapor which is formed in the reactor is gradually reduced in pressure over the course of 60 minutes, while at the same time gradually increasing the temperature of the material such that it becomes established at Tm+10° C. at atmospheric pressure.

The polymerization is then continued under nitrogen flushing at 20 l/h until the targeted weight Mn indicated in the characteristics table is obtained.

The polymer is then emptied out via the bottom valve, then cooled in a water tank, and then formed into granules.

The results are presented in the following table 1.

TABLE 1

Characteristics of the polymers prepared via the direct route without reactive prepolymer

| Ref | Test type | Molecular structure/ molar composition | Tm (° C.)/ Tg (° C.) | Tm − Tg (° C.) | Tc (° C.) | Tm − Tc (° C.) | Ē Hc (J/g) | Intrinsic viscosity (m-cresol) | Nonreactive chain ends meq/kg(**) (calc) | Acid number meq/kg | Amine number meq/kg | Mn g/mol |
|---|---|---|---|---|---|---|---|---|---|---|---|---|
| 1 | Comparative, (EP1988 113) | 10.T/6.T (59/41) | 281/122 | 159 | 236 | 45 | 44 | 1.12 | 103 | 45 | 60 | 9600 |
| 2 | Comparative, (EP198811) | 10.T/6.T/11 (60/24/16) | 269/111 | 158 | 220 | 49 | 39 | 1.25 | 91 | 55 | 48 | 10300 |
| 3 | Comparative, (WO 2011/00393) | 10.T/TMD.T (59/41) | 263/133 | 130 | 197 | 66 | 35 | 1.15 | 97 | 63 | 35 | 10250 |
| 4 | Comparative | 10.T (100) | 314/120 | 194 | 279 | 35 | 63 | insoluble | 154 | 54 | 22 | 8700 |
| 5 | Comparative | 10.T/11 (67/33) | 269/84 | 185 | 232 | 37 | 50 | 1.19 | 119 | 55 | 40 | 9350 |

TABLE 1-continued

Characteristics of the polymers prepared via the direct route without reactive prepolymer

| Ref | Test type | Molecular structure/ molar composition | Tm (° C.)/ Tg (° C.) | Tm − Tg (° C.) | Tc (° C.) | Tm − Tc (° C.) | Ē Hc (J/g) | Intrinsic viscosity (m-cresol) | Nonreactive chain ends meq/kg(**) (calc) | Acid number meq/kg | Amine number meq/kg | Mn g/mol |
|---|---|---|---|---|---|---|---|---|---|---|---|---|
| 6 | Comparative | 10.T/11 (59/41) | 261/78 | 183 | 213 | 48 | 39 | 1.15 | 112 | 22 | 34 | 11900 |
| 7 | Comparative | 10.T/10.I (67/33) | 269/110 | 159 | 205 | 64 | 32 | 1.12 | 97 | 48 | 51 | 10100 |
| 8 | Comparative | MXD.T/11 (59/41) | 211/111 | 100 | (*) | >100 | 12 | 1.25 | | | | |
| 9 | Comparative | MPMD.T/11 (59/41) | —/84 | — | (*) | — | — | 1.14 | | | | |
| 10 | According to the invention | 10.T/MXD.T (67/33) | 270/130 | 140 | 244 | 26 | 47 | 1.03 | 143 | 85 | 42 | 7400 |
| 11 | According to the invention | 10.T/MXD.T (59/41) | 269/131 | 138 | 241 | 28 | 44 | 1.01 | 100 | 134 | 38 | 7350 |
| 12 | Comparative, outside the invention | 10.T/MXD.T (50/50) | 262/137 | 125 | 211 | 51 | 17 | 0.99 | 136 | 97 | 37 | 7400 |
| 13 | According to the invention | 10.T/MPMD.T (67/33) | 270/124 | 146 | 230 | 40 | 45 | 1.05 | 139 | 63 | 42 | 8200 |
| 14 | According to the invention | 10.T/MPMD.T (59/41) | 264/126 | 138 | 219 | 45 | 40 | 1.11 | 155 | 59 | 27 | 8300 |
| 15 | Comparative, outside the invention | 10.T/MPMD.T (50/50) | 245/127 | 118 | 185 | 60 | 22 | 1.12 | | | | |
| 16 | Comparative, outside the invention | 10.T/12.T (59/41) | 280/114 | 166 | 260 | 20 | 62 | 0.81 | 0 | 263 | <10 | 7600 |
| 17 | According to the invention | 10.T/12.T/11 (60/24/16) | 271/105 | 166 | 246 | 25 | 56 | 0.98 | 169 | 49 | 32 | 8000 |
| 18 | According to the invention | 18.T/MXD.T (71/29) | 264/95 | 169 | 242 | 22 | 47 | 0.86 | 174 | 73 | 35 | 7100 |

(*)No crystallization on cooling
(**)Milliequivalents per kilogram

The tests representative of the invention show greater performance levels compared with the comparative tests outside the invention, including some which are representative of the prior art cited, in particular in terms of small (<30° C.) difference Tm−Tc and for Tm−Tc ranging from 30 to 50° C. with difference Tm−Tg<150° C.

B—Preparation of a Polyamide Polymer By Chain Extension of a Reactive Prepolymer (or Oligomer)

B-1 Preparation of the Reactive Prepolymer P(X)n 5 kg of the following starting materials are placed in a 14-liter autoclave reactor:
500 g of water,
the diamine(s),
the amino acid (optionally),
terephthalic acid,
35 g of sodium hypophosphite in solution,
0.1 g of a Wacker AK1000 antifoam (the company Wacker Silicones).

The nature and molar ratios of the molecular units and structures of the reactive prepolymer polyamides (by referenced test) are given in table 2 below.

The closed reactor is purged of its residual oxygen and then heated at a temperature of 230° C. of the material. After stirring for 30 minutes under these conditions, the pressurized vapor which has formed in the reactor is gradually reduced in pressure over the course of 60 minutes, while at the same time gradually increasing the temperature of the material such that it becomes established at Tm+10° C. at atmospheric pressure.

The oligomer (prepolymer) is then emptied out via the bottom valve, then cooled in a waterbath, and then ground.

The characteristics are presented in the following table 2.

TABLE 2

Characteristics of the prepolymers prepared

| Ref | | Molecular structure and molar composition | Tm (° C.) | Tg (° C.) | Tm − Tg (° C.) | Tc (° C.) | Tm − Tc (° C.) | Ē H (J/g) | Intrinsic viscosity (in m-cresol) | Acid number meq/kg(*) | Amine number meq/kg | Mn g/mol |
|---|---|---|---|---|---|---|---|---|---|---|---|---|
| 19 | According to the invention | 10.T/MXD.T (59/41) | 264 | 117 | 147 | 232 | 32 | 42 | 0.32 | 878 | 0 | 2280 |

TABLE 2-continued

Characteristics of the prepolymers prepared

| Ref | | Molecular structure and molar composition | Tm (° C.) | Tg (° C.) | Tm – Tg (° C.) | Tc (° C.) | Tm – Tc (° C.) | ΔH (J/g) | Intrinsic viscosity (in m-cresol) | Acid number meq/kg(*) | Amine number meq/kg | Mn g/mol |
|---|---|---|---|---|---|---|---|---|---|---|---|---|
| 20 | According to the invention | 10.T/MPMD.T (59/41) | 265 | 109 | 156 | 221 | 44 | 41 | 0.32 | 858 | 0 | 2330 |

(*)Milliequivalents per kilogram

B-2 Preparation of the Polyamide Polymer By Chain Extension with an Extender of Y-A-Y Type 10 g of the dried and ground oligomer above are mixed with a stoichiometric amount of 1,3-phenylenebisoxazoline (PBO). The mixture is introduced under nitrogen flushing into a DSM co-rotating conical screw microextruder (having a volume of 15 ml) preheated to 280° C. with screw rotation at 100 rpm. The mixture is left to recirculate in the microextruder and the increase in viscosity is monitored by measuring the normal force. After approximately 2 minutes, a plateau is reached and the contents of the microextruder is emptied out in the form of a rod. The air-cooled product is formed into granules.

The results of the product analyses are presented in table 3 below.

TABLE 3

Analytical characteristics of the polyamides obtained with chain extension

| Ref | | Molecular structure/molar composition | Tm (° C.) | Tg (° C.) | Tm – Tg (° C.) | Tc (° C.) | Tm – Tc (° C.) | ΔH (J/g) | Intrinsic viscosity (in m-cresol) |
|---|---|---|---|---|---|---|---|---|---|
| 21 | According to the invention | 10.T/MXD.T (59/41) | 256 | 135 | 121 | 219 | 37 | 30 | 1.3 |
| 22 | According to the invention | 10.T/MPMD.T (59/41) | 262 | 128 | 134 | 210 | 52 | 36 | 0.82 |

C—Composite Formulation Comprising Short Fibers

C-1 Preparation of the Formulation

The granules resulting from step A are compounded on an Evolum 32 twin-screw extruder according to a flat temperature profile of 280° C. The flow rate is 40 kg/h and the speed is 300 rpm. The polymer (49.65% by weight) and the additives (0.3% of calcium stearate and 0.4% of Irganox 1010) are introduced into the main hopper. The Asahi CS 692 FT glass fiber (49.65% by weight) is introduced via a side feeder in the second part of the extruder. The rods are cooled in water and formed into granules.

The results of the product analyses obtained are presented in table 4 below.

TABLE 4

Obtained characteristics of the formulations processed

| Ref | | Molar composition of the polymer | Tm (° C.) | Tg (° C.) | Tm – Tg (° C.) | Tc (° C.) | Tm – Tc (° C.) | ΔH (J/g) |
|---|---|---|---|---|---|---|---|---|
| 23 | Comparative | 10.T/11 (67/33) | 269 | 81 | 188 | 234 | 35 | 24 |
| 24 | Comparative, According to EP 1 988 113 | 10.T/6.T/11 (60/24/16) | 269 | 105 | 164 | 237 | 32 | 30 |
| 25 | According to the invention | 10.T/MXD.T (59/41) | 267 | 128 | 139 | 241 | 26 | 22 |

The composition based on 10.T/MXDT still exhibits a higher crystallization ability associated with a very high Tg and in particular a small Tm−Tg.

C-2 Mechanical Properties (Hot Strength) with Temperature

The granules of the formulations below are formed into 80×10×4 mm bars by injection-molding using a Krauss-Maffei 60 metric tonne B2 machine equipped with a screw having a diameter Ø of 30 mm. The samples were injected at 260° C. into a mold at 90° C. at 130 rpm (measured material pressure of 833 bar). The material was kept under a pressure of 611 bar for 15 s, before cooling the mold over the course of 20 s.

3-point bending tests according to standard ISO 178 are carried out at various temperatures on a Zwick 1 dynamometer. The radii of the punch and of the supports are 5 mm. The speed is 2 mm/min and the modulus is calculated between 0.05% and 0.25% deformation.

The results are given in table 5 below.

TABLE 5

Mechanical performance results

| Ref | | Molecular structure and molar composition | Tm (° C.) | Tg (° C.) | Tm − Tg (° C.) | Modulus E at 23° C. (MPa) | Modulus E at 90° C. in MPa/(% loss vs 23° C.) | Modulus E at 100° C. in MPa/(% loss vs 23° C.) | Modulus E at 120° C. in MPa/(% loss vs 23° C.) |
|---|---|---|---|---|---|---|---|---|---|
| 23 | Comparative | 10.T/11 (67/33) | 269 | 81 | 188 | 12690 | 7370/(−42%) | 6110/(−52%) | 5260/(−59%) |
| 24 | Comparative (EP198811) | 10.T/6.T/11 (60/24/16) | 269 | 105 | 164 | 10380 | 8930/(−14%) | 4900/(−53%) | 3860/(−63%) |
| 25 | According to the invention | 10.T/MXD.T (59/41) | 267 | 128 | 139 | 8780 | 7890/(−10%) | 8040/(−8%) | 5730/(−35%) |

A mechanical strength in modulus which is significantly greater and favorable to the composition according to the invention is noted, with a performance loss at 100° C. which is more than 5 times less than that of the compositions outside the invention.

EMBODIMENTS

1. A composition for thermoplastic composite material or a composition of thermoplastic composite material, said composite material comprising reinforcing fibers or a fibrous reinforcement, and a thermoplastic matrix which impregnates said fibers (or said fibrous reinforcement), said matrix being based on at least one thermoplastic polymer, said composition being characterized:
   in that said matrix thermoplastic polymer is a semi-crystalline polyamide polymer with a glass transition temperature Tg of at least 90° C. and with a melting temperature Tm below or equal to 280° C.,
   in that said composition, in addition to said reinforcing fibers, comprises:
     a) a reactive composition comprising or consisting of at least one reactive polyamide prepolymer, said composition being a composition which is a precursor of said polyamide polymer of said matrix,
     or as an alternative to a),
     b) a nonreactive composition of at least one polyamide polymer, said composition being that of said thermoplastic matrix with the Tg and the Tm being as defined above, and
   in that said composition a) or b) comprises or consists of one or more polyamides which are prepolymers according to a) or which are polymers according to b), which comprise different amide units A and B and, optionally, amide units C and D, selected as follows:
   A: is a major amide unit present at a molar content ranging from 55% to 95%, preferably from 55% to 85%, more preferentially from 55% to 80%, chosen from x.T units, where x is a $C_9$ to $C_{18}$, preferably $C_9$, $C_{19}$, $C_{11}$ and $C_{12}$, linear aliphatic diamine, and where T is terephthalic acid,
   B: is an amide unit different than A, said unit B being present at a molar content ranging from 5% to 45%, preferably from 15% to 45%, more preferentially from 20% to 45%, according to the Tm of the polyamide based on unit A and said amide unit B being chosen from x'.T units, where x' is chosen from:
     B1) a branched aliphatic diamine bearing a single methyl or ethyl branching and having a main chain length which is different by at least two carbon atoms compared with the main chain length of the diamine x of said associated unit A, preferably x' being 2-methylpentamethylenediamine (MPMD), or
     B2) m-xylylenediamine (MXD) or
     B3) a $C_4$ to $C_{18}$ linear aliphatic diamine when, in the unit A, said diamine x is a $C_{11}$ to $C_{18}$ linear aliphatic diamine and x' is a $C_9$ to $C_{18}$ diamine when, in the unit A, said diamine x is a $C_9$ or $C_{10}$ diamine,
   and preferably B being chosen from x'.T, where x' is MPMD according to B1) or MXD according to B2) or a linear aliphatic diamine as defined above according to B3) and more preferentially x' is MPMD according to B1) or MXD according to B2) and even more preferentially MXD according to B2),
   C: optional amide unit different than A and than B, chosen from amide units based on a cycloaliphatic and/or aromatic structure or based on x'T as defined above for B but with x' being different than x' for the unit B,
   D: optional amide unit different than A, than B and than C when C is present, and chosen from the aliphatic amide units derived from:
     amino acids or lactams which are $C_6$ to $C_{12}$, preferably $C_6$, $C_{11}$ and $C_{12}$, or mixtures thereof,
     the reaction of a $C_6$ to $C_{18}$, preferably $C_6$ to $C_{12}$ linear aliphatic diacid and of a $C_6$ to $C_{18}$, preferably $C_6$ to $C_{12}$, linear aliphatic diamine, or mixtures thereof,
   and under the condition that the sum of the molar contents of A+B+C+D is equal to 100%.

2. The composition as in embodiment 1, characterized in that said amide unit C is present and partially replaces B at a molar content ranging up to 25% relative to said unit B.

3. The composition as in either of embodiments 1 and 2, characterized in that said unit D is present and partially replaces B at a molar content ranging up to 70%, relative to said unit B.

4. The composition as in one of embodiments 1 to 3, characterized in that the difference Tm−Tc, between the melting temperature Tm and the crystallization temperature Tc of said matrix polymer, does not exceed 50° C., preferably does not exceed 40° C., more preferentially does not exceed 30° C.

5. The composition as in one of embodiments 1 to 4, characterized in that the enthalpy of crystallization, measured by differential scanning calorimetry (DSC) according to standard ISO 11357-3, is greater than 40 J/g, preferably greater than 45 J/g.

6. The composition as in one of embodiments 1 to 5, characterized in that said amide unit A is present with a molar content ranging from 55% to 80%, preferably from 55% to 75%, more preferentially from 55% to 70%, relative to all the units of said polymer.

7. The composition as in one of embodiments 1 to 6, characterized in that said unit B corresponds to x'T with x' chosen according to option B1), in particular with x' being MPMD.

8. The composition as in one of embodiments 1 to 6, characterized in that said unit B corresponds to x'T with x' chosen according to option B2), x' being MXD.

9. The composition as in one of embodiments 1 to 6, characterized in that said unit B corresponds to a linear aliphatic diamine according to option B3).

10. The composition as in one of embodiments 1 to 6, characterized in that the units A and B are selected as follows:
  for the unit A being 9T, said unit B is selected from: 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferentially MPMD.T or MXD.T, with a molar content of B ranging from 30% to 45%,
  for the unit A being 10T, said unit B is selected from: 9T, 11T, 12T, 13T, 14T, 15T, 16T, 17T and 18T, MPMD.T and MXD.T, preferably 12T, 13T, 14T, 15T, 16T, 17T and 18T, MPMD.T and MXD.T, more preferentially MPMD.T or MXD.T, with a molar content of B ranging from 25% to 45%,
  for the unit A being 11T, said unit B is selected from: 9T, 10T, 12T, 13T, 14T, 15T, 16T, 17T and 18T, MPMD.T and MXD.T, preferably 9T, 13T, 15T, 16T, 17T and 18T, MPMD.T and MXD.T, more preferentially MPMD.T or MXD.T, with a molar content of B ranging from 20% to 45%,
  for the unit A being 12T, said unit B is selected from: 9T, 10T, 11T, 13T, 14T, 15T, 16T, 17T and 18T, MPMD.T and MXD.T, preferably 9T, 10T, 14T, 15T, 16T, 17T and 18T, MPMD.T and MXD.T, more preferentially MPMD.T or MXD.T, with a molar content of B ranging from 20% to 45%.

11. The composition as in embodiment 10, characterized in that the unit A is a 9T unit and the unit B is selected from: 10T, 11T, 12T, 13T, 14T, 15T, 16T, 17T and 18T, MPMD.T and MXD.T, preferably 11T, 12T, 13T, 14T, 15T, 16T, 17T and 18T, MPMD.T and MXD.T, more preferentially MPMD.T or MXD.T, with a molar content of B ranging from 30% to 45%.

12. The composition as in embodiment 10, characterized in that the unit A is a 10T unit and the unit B is selected from: 9T, 11T, 12T, 13T, 14T, 15T, 16T, 17T and 18T, MPMD.T and MXD.T, preferably 12T, 13T, 14T, 15T, 16T, 17T and 18T, MPMD.T, more preferentially MPMD.T or MXD.T and MXD.T, with a molar content of B ranging from 25% to 45%.

13. The composition as in embodiment 10, characterized in that the unit A is an 11T unit and the unit B is selected from: 9T, 10T, 12T, 13T, 14T, 15T, 16T, 17T and 18T, MPMD.T and MXD.T, preferably 9T, 13T, 15T, 16T, 17T and 18T, MPMD.T and MXD.T, more preferentially MPMD.T or MXD.T, with a molar content of B ranging from 20% to 45%.

14. The composition as in embodiment 10, characterized in that the unit A is a 12T unit and the unit B is selected from: 10T, 11T, 13T, 14T, 15T, 16T, 17T and 18T, MPMD.T and MXD.T, preferably 9T, 10T, 14T, 15T, 16T, 17T and 18T, MPMD.T and MXD.T, more preferentially MPMD.T or MXD.T, with a molar content of B ranging from 20% to 45%.

15. The composition as in one of embodiments 7 to 15, characterized in that a part of the unit B which is up to 70 mol %, preferably less than 40 mol %, relative to B, is replaced with a unit C and/or D as defined in one of embodiments 1 to 3.

16. The composition as in one of embodiments 1 to 15, characterized in that said polyamide composition is a non-reactive composition according to b).

17. The composition as in one of embodiments 1 to 15, characterized in that said polyamide composition is a prepolymer reactive composition according to a) which is a precursor of said polyamide polymer of said matrix of the composite.

18. The composition as in embodiment 17, characterized in that said composition a) comprises or consists of at least one reactive prepolymer bearing, on the same chain, two end functions X' and Y', said functions being respectively coreactive with one another by condensation, with X' and Y' being amine and carboxy or carboxy and amine respectively.

19. The composition as in embodiment 17, characterized in that said reactive composition a) comprises at least two polyamide prepolymers which are reactive with one another and each bearing respectively two identical end functions X' or Y', said function X' of a prepolymer being able to react only with said function Y' of the other prepolymer, in particular by condensation, more particularly with X' and Y' being amine and carboxy or carboxy and amine respectively.

20. The composition as in embodiment 17, characterized in that said composition a) or precursor composition comprises or consists of:
  a1) at least one prepolymer of said thermoplastic polyamide polymer, bearing n end reactive functions X, chosen from: —NH$_2$, —CO$_2$H and —OH, preferably NH$_2$ and —CO$_2$H, with n being 1 to 3, preferably from 1 to 2, more preferentially 1 or 2, more particularly 2;
  a2) at least one chain extender Y-A'-Y, with A' being a hydrocarbon-based diradical of nonpolymeric structure, bearing 2 identical end reactive functions Y, which are reactive, by polyaddition, with at least one function X of said prepolymer a1), preferably having a molecular weight of less than 500 and more preferentially less than 400.

21. The composition as in one of embodiments 17 to 20, characterized in that said reactive prepolymers of said composition a) have a number-average molecular weight Mn ranging from 500 to 10 000, preferably from 1000 to 6000.

22. The composition as in one of embodiments 1 to 21, characterized in that it comprises a fibrous reinforcement with long fibers, in particular with a circular cross section, with L/D>1000, preferably >2000, and more particularly selected from glass fibers, carbon fibers, ceramic fibers, aramid fibers, or mixtures thereof.

23. The composition as in one of embodiments 1 to 22, characterized in that it is a molding composition.

24. A process for manufacturing a thermoplastic composite material, in particular a mechanical part or a structural part based on said material, having the composition as defined in one of embodiments 1 to 23, characterized in that it comprises at least one step of polymerization of at least one reactive composition a) as defined in one of embodiments 17 to 21 or a step of molding or processing at least one nonreactive composition b), as defined in embodiment 16.

25. The process as in embodiment 24, characterized in that it comprises the following steps:
 i) impregnation in the molten state of a fibrous reinforcement with a composition as defined in one of embodiments 1 to 23 but not comprising said fibrous reinforcement, in an open or closed mold or outside the mold, in order to obtain a composition as defined in one of embodiments 1 to 23,
 ii) polymerization reaction in the case of a polyamide reactive composition a) as in one of embodiments 17 to 21, by heating said composition of step i) with chain extension, as appropriate, by polycondensation reaction or by polyaddition reaction, in bulk in the molten state with, in the case of polycondensation, elimination under vacuum of the condensation products when a closed mold is involved, using a vacuum extraction system, otherwise and preferably with the polycondensation being carried out in an open mold or outside the mold,
 iii) processing or molding of said composition of step i) in the case of a nonreactive polyamide composition b) so as to form the final composite part in a mold or with another processing system and, in the case of a reactive composition a), a step of processing by molding or by means of another processing system and simultaneously with the polymerization step ii).

26. The process as in embodiment 25, characterized in that said processing is carried out according to an RTM, S-RIM, injection-compression or pultrusion process or by infusion, in particular in the case of a reactive composition a).

27. A semi-crystalline polyamide polymer, characterized in that it corresponds to the (or is the) polymer of the thermoplastic matrix of said thermoplastic composite material, as defined in one of embodiments 1 to 23, said polymer being a nonreactive polymer as defined according to said composition b) or a polymer which can be obtained from a reactive composition as defined according to said composition a).

28. The use of a composition as defined in one of embodiments 1 to 23 or of a polymer as defined in embodiment 27, for manufacturing mechanical or structural parts based on said composite material.

29. The use as in embodiment 28, characterized in that said mechanical or structural parts made of said composite material concern applications in the following fields: the motor vehicle industry, the railroad industry, the marine (maritime) industry, wind power, photovoltaics, the solar industry, including solar panels and components for solar power stations, sports, aeronautics and space, road transport (concerning trucks), the construction industry, civil engineering, panels, and leisure.

30. The use as in embodiment 29, characterized in that it concerns applications in the field of wind power and in that said Tg of said polyamide is at least 90° C.

31. The use as in embodiment 29, characterized in that it concerns applications in the field of the motor vehicle industry and in that said Tg of said polyamide is at least 100° C.

32. The use as in embodiment 29, characterized in that it concerns applications in the field of aeronautics and in that said Tg of said polyamide is at least 120° C.

33. A thermoplastic composite material characterized in that it results from the use of at least one composition for thermoplastic composite material as defined in one of embodiments 1 to 23.

34. A mechanical or structural part made of thermoplastic composite material, characterized in that it results from the use of at least one composition as defined in one of embodiments 1 to 23 or from the use of a polyamide polymer as defined in embodiment 27 or that it is based on a composite material as defined in embodiment 30 or that it is obtained by means of a process as defined in one of embodiments 22 to 26.

35. The structural part as in embodiment 34, characterized in that it is a motor vehicle part post-treated by cataphoresis.

36. The part as in embodiment 34, characterized in that it is a part for wind power.

37. The part as in embodiment 34, characterized in that it is a part for aeronautics.

The invention claimed is:
1. A composition for a thermoplastic composite material, said thermoplastic composite material comprising reinforcing fibers or a fibrous reinforcement, and a thermoplastic matrix which impregnates said reinforcing fibers or said fibrous reinforcement,
 said composition comprises:
  reinforcing fibers or a fibrous reinforcement; and
  a reactive composition comprising one or more reactive polyamide prepolymers, said composition being a composition which is a precursor of a polyamide polymer of said thermoplastic matrix,
 wherein said one or more reactive polyamide prepolymers comprise different amide units A and B and, optionally, amide units C and D, selected as follows:
  A: is a major amide unit present at a molar content ranging from 55% to 95%, chosen from x.T units, where x is a $C_9$ to $C_{18}$, linear aliphatic diamine, and where T is terephthalic acid,
  B: is an amide unit different than A, said unit B being present at a molar content ranging from 5% to 45%, according to the Tm of the polyamide based on unit A and said amide unit B being chosen from x'.T units, where x' is chosen from:
   B1) a branched aliphatic diamine bearing a single methyl or ethyl branching and having a main chain length which is different by at least two carbon atoms compared with the main chain length of the diamine x of said associated unit A,
   B2) m-xylylenediamine (MXD) or
   B3) a $C_4$ to $C_{18}$ linear aliphatic diamine when, in the unit A, said diamine x is a $C_{11}$ to $C_{18}$ linear aliphatic diamine and x' is a $C_9$ to $C_{18}$ diamine when, in the unit A, said diamine x is a $C_9$ or $C_{10}$ diamine,

C: optional amide unit different than A and than B, chosen from amide units based on a cycloaliphatic and/or aromatic structure or based on x'T as defined above for B but with x' being different than x' for the unit B, and D: optional amide unit different than A, than B and than C when C is present, and chosen from the aliphatic amide units derived from:

amino acids or lactams which are $C_6$ to $C_{12}$, r mixtures thereof, the reaction of a $C_6$ to $C_{18}$ linear aliphatic diacid and of a $C_6$ to $C_{18}$ linear aliphatic diamine, or mixtures thereof, and under the condition that the sum of the molar contents of A+B+C+D is equal to 100%, wherein one or more reactive polyamide prepolymers is a precursor of a semi-crystalline polyamide polymer with a glass transition temperature Tg of at least 90° C. and with a melting temperature Tm below or equal to 280° C., and wherein said reactive composition further comprises:

a1) at least one reactive polyamide prepolymer of said thermoplastic composite material, bearing n end reactive functions X, chosen from: $-NH_2$, $-CO_2H$ and $-OH$, with n being 2; and a2) at least one chain extender Y-A'-Y, with A' being a hydrocarbon-based diradical of nonpolymeric structure, bearing 2 identical end reactive functions Y, which are reactive, by polyaddition, with at least one function X of said reactive polyamide prepolymer a1), a2) having a molecular weight of less than 500, wherein Y is selected from the group consisting of maleimide, optionally blocked isocyanate, oxazinone and oxazolinone.

2. The composition of claim 1, wherein said amide unit C is present and partially replaces B at a molar content ranging up to 25% relative to said unit B.

3. The composition of claim 1, wherein said unit D is present and partially replaces B at a molar content ranging up to 70%, relative to said unit B.

4. The composition of claim 1, wherein the difference Tm−Tc, between the melting temperature Tm and the crystallization temperature Tc of said semi-crystalline polyamide, does not exceed 50° C.

5. The composition of claim 1, wherein the enthalpy of crystallization of said semi-crystalline polyamide, measured by differential scanning calorimetry (DSC) according to standard ISO 11357-3, is greater than 40 J/g.

6. The composition of claim 1, wherein said amide unit A is present with a molar content ranging from 55% to 80%, relative to all the units of said polymer.

7. The composition of claim 1, wherein said unit B corresponds to x'T with x' being 2-methylpentamethylenediamine (MPMD).

8. The composition of claim 1, wherein said unit B corresponds to x'T with x' chosen according to option B2), x' being MXD.

9. The composition of claim 1, wherein said unit B corresponds to a linear aliphatic diamine according to option B3).

10. The composition of claim 1, wherein the units A and B are selected as follows:

for the unit A being 9T, said unit B is selected from: 10T, 11T, 12T, 13T, 14T, 15T, 16T, 17T and 18T, 2-methylpentamethylenediamine (MPMD).T and MXD.T, with a molar content of B ranging from 30% to 45%, for the unit A being 10T, said unit B is selected from: 9T, 11T, 12T, 13T, 14T, 15T, 16T, 17T and 18T, MPMD.T and MXD.T, with a molar content of B ranging from 25% to 45%, for the unit A being 11T, said unit B is selected from: 9T, 10T, 12T, 13T, 14T, 15T, 16T, 17T and 18T, MPMD.T and MXD.T, with a molar content of B ranging from 20% to 45%, and for the unit A being 12T, said unit B is selected from: 9T, 10T, 11T, 13T, 14T, 15T, 16T, 17T and 18T, MPMD.T and MXD.T, with a molar content of B ranging from 20% to 45%.

11. The composition of claim 7, wherein a part of the unit B which is up to 70 mol %, relative to B, is replaced with a unit C and/or D.

12. The composition of claim 1, wherein said reactive prepolymers of said reactive composition have a number-average molecular weight Mn ranging from 500 to 10 000.

13. The composition of claim 1, wherein the composition comprises a fibrous reinforcement with long fibers with L/D>1000.

14. A process for manufacturing a thermoplastic composite material, having the composition of claim 1, wherein the process comprises at least one step of polymerization of at least one reactive composition which is a precursor of said polyamide polymer of said matrix of the thermoplastic composite material.

15. The process of claim 14, wherein the process comprises the following steps:

i) impregnation in the molten state of a fibrous reinforcement with the reactive composition, in an open or closed mold or outside the mold, in order to obtain the thermoplastic composite material, ii) polymerization reaction by heating said composition of step i) with chain extension, as appropriate, by polycondensation reaction or by polyaddition reaction, in bulk in the molten state with, in the case of polycondensation, elimination under vacuum of the condensation products when a closed mold is involved, using a vacuum extraction system, otherwise with the polycondensation being carried out in an open mold or outside the mold, and iii) processing by molding or by means of another processing system and simultaneously with the polymerization step ii).

16. A method for manufacturing mechanical or structural parts based on said composite material, comprising using a composition of claim 1.

17. The method of claim 16, wherein said mechanical or structural parts made of said composite material concern applications in the following fields: the motor vehicle industry, the railroad industry, the marine or maritime industry, wind power, photovoltaics, the solar industry, including solar panels and components for solar power stations, sports, aeronautics and space, road transport, the construction industry, civil engineering, panels, and leisure.

18. A thermoplastic composite material wherein the thermoplastic composite material results from the use of at least one composition for thermoplastic composite material of claim 1.

19. A mechanical or structural part made of thermoplastic composite material, wherein part results from the use of at least one composition of claim 1.

20. The structural part of claim 19, wherein the part is a motor vehicle part post-treated by cataphoresis.

21. The structural part of claim 19, wherein the part is a part for wind power.

22. The structural part as claimed in claim 19, wherein the part is a part for aeronautics.

23. The composition of claim 1, wherein said glass transition temperature Tg is at least 100° C.

24. The composition of claim 1, wherein said melting temperature Tm is below or equal to 270° C.

25. The composition of claim 1, wherein said reinforcing fibers or fibrous reinforcement is/are circular in cross-section.

* * * * *